E. A. IVATTS.
REGISTERING DEVICE FOR KINEMATOGRAPHS.
APPLICATION FILED DEC. 13, 1910.

1,018,827.

Patented Feb. 27, 1912.
2 SHEETS—SHEET 1.

UNITED STATES PATENT OFFICE.

ERNEST ALBERT IVATTS, OF PARIS, FRANCE, ASSIGNOR TO COMPAGNIE GENERALE DE PHONOGRAPHES, CINEMATOGRAPHES ET APPAREILS DE PRECISION, OF PARIS, FRANCE.

REGISTERING DEVICE FOR KINEMATOGRAPHS.

1,018,827.

Specification of Letters Patent. Patented Feb. 27, 1912.

Application filed December 13, 1910. Serial No. 597,064.

*To all whom it may concern:*

Be it known that I, ERNEST ALBERT IVATTS, a citizen of Great Britain, residing at Paris, in the Department of the Seine and Republic of France, have invented certain new and useful Improvements in Registering Devices for Kinematographs, of which the following is a specification.

Hitherto in kinematographic apparatus for projecting living pictures several arrangements or devices have been employed for obtaining the adjustment of the pictures, these various means being generally based either on the displacement of the film in the slide-passage for the purpose of making the center of the pictures coincide with the center of the exposure or exhibiting opening, or on the displacement of the said opening so as to cause its center to coincide with the center of the pictures of the film without displacing the latter. In the latter case for the purpose of effecting the adjustment, the aperture and objective, rigidly connected together or not, the condenser and the lamp are moved successively and independently in a vertical direction. This latter method of adjustment is long, difficult, and lacking in precision, inasmuch as it is only with great difficulty that the center of the image can be made exactly to coincide with the optical axis of the whole system, this being an essential condition for obtaining a satisfactory result when projecting living pictures.

The present invention is for the purpose of doing away with the inconveniences of this method of adjustment, in which the film is fixed. It is based on the following principle: In order to obtain the adjustment of the pictures of kinematographic films in apparatus for projecting pictures, the source of illumination, the condenser, the exposure opening and the lens are moved simultaneously and dependently, the centers of these four parts being immovably connected together and situated in the same line constituting the optical axis of the apparatus.

Figure 1:
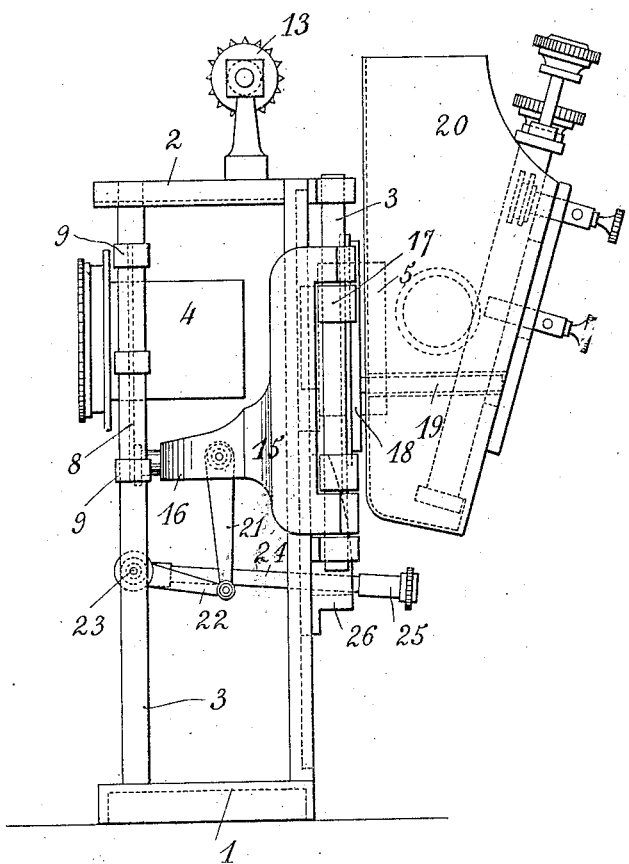
Figure 2:
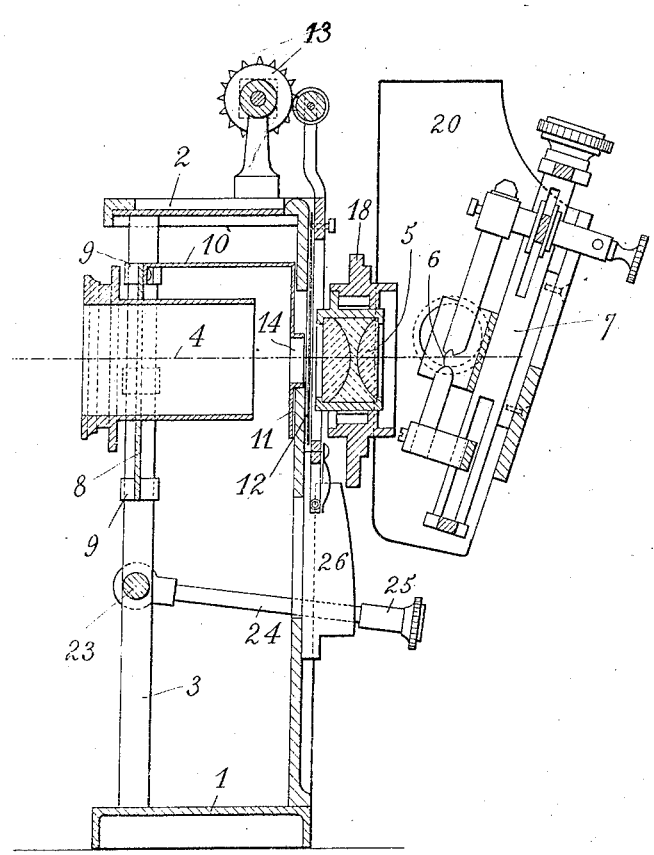

I shall now describe my invention with reference to the accompanying drawings showing an apparatus embodying the above mentioned principle and in which:

Figure 1 is a side view. Fig. 2 is a vertical section through the optical axis of the apparatus.

This apparatus in which are to be found all the parts employed in the ordinary apparatus is characterized by a suitable arrangement of these said parts so as to permit the new arrangement of the optical system according to the principle of the invention. For this purpose the base 1 and the upper plate 2 of the apparatus are connected by pillars 3 along which the optical system, consisting of the lens 4, the condenser 5, and the source of illumination 6, formed in the present instance by an electric arc lamp 7 provided with the ordinary means for regulating the carbons, can be displaced. The positive connection between these three parts and their simultaneous displacement in a vertical direction are obtained by the following arrangement: A plate 8 supporting the lens 4 slides between the front pillars 3 by means of guides 9. This plate is bent back twice at right angles, at 10 and 11, so that the surface 11 slides along the film passage 12 in which the film passes on its passage from the drum 13. This surface 11 is provided in its center with a rectangular opening of dimensions corresponding to those of the pictures of the films to be adjusted and the center of which owing to its construction coincides as exactly as possible with the optical axis of the lens 4. A casing 15 slides on the back pillar 3 and is provided with a prolongation 16 rigidly fastened to the plate 8. The guides 17 of the mounting 18 of the condenser 5 slide on the said pillar 3 and also serve as hinges to enable the mounting 18 of the condenser to be opened so as to give access to the door of the film passage 12 through which the films are passed. Two rods 19 are provided on this mounting 18 and serve to receive a metallic casing 20 containing the electric arc 6.

The displacement of the optical system 4, 5, 6 is effected by means of a connecting rod 21 pivoted to the casing 15, and by a lever 22 keyed to the end of a shaft 23 at the opposite end of which is keyed a second lever 24 terminating in a milled fixing stop 25 moving along a guide 26. By moving the milled stop 25 along the guide 26, the optical system 4, 5, 6 can be displaced and thus brought rapidly and exactly into the absolutely correct position by bringing the opening 14 of the plate 11 before one of the pictures of the film situated in the film passage 12.

Having now particularly described and ascertained the nature of my invention, I declare that what I claim is:

1. A kinematographic apparatus comprising a condenser, lens, an apertured screen, means for normally holding said condenser, lens and apertured screen in substantial alinement, and means for simultaneously shifting said parts laterally with respect to the film.

2. A kinematographic apparatus comprising a source of light, a condenser, lens, an apertured screen, and means for simultaneously displacing all of said parts laterally with respect to the film.

3. A kinematographic apparatus comprising a source of light, a condenser lens, an objective, an apertured screen, means for normally holding said source of light, condenser lens, objective and apertured screen in substantial alinement, and means for simultaneously shifting said parts substantially parallel to that portion of the line of travel of the film which may be intersected by light rays from said source.

4. A kinematographic apparatus comprising a source of light, a condenser lens, an objective, an apertured screen, and means for simultaneously displacing all of said parts substantially parallel to that portion of the line of travel of the film which may be intersected by light rays from said source.

In testimony whereof I affix my signature in presence of two witnesses.

ERNEST ALBERT IVATTS.

Witnesses:
HENRY DANTIER,
LUCIEN CRESPING.